United States Patent

[11] 3,612,541

[72] Inventor William B. Huber
Park Forest, Ill.
[21] Appl. No. 806,492
[22] Filed Mar. 12, 1969
[45] Patented Oct. 12, 1971
[73] Assignee Motorola, Inc.
Franklin Park, Ill.

[54] CARTRIDGE LOCKING MECHANISM

6 Claims, 3 Drawing Figs.

[52] U.S. Cl. .......... 274/4 R
[51] Int. Cl. .......... G11b 5/00
[50] Field of Search .......... 274/4, 11; 352/74, 78, 72; 179/100.2 Z

[56] References Cited

UNITED STATES PATENTS

| | | | |
|---|---|---|---|
| 3,311,316 | 3/1967 | Williams | 179/100.2 Z |
| 3,478,973 | 11/1969 | Lear et al. | 274/4 B |

*Primary Examiner*—Harry N. Haroian
*Attorney*—Mueller and Aichele

ABSTRACT: A cartridge locking mechanism for a cartridge or cassette tape player includes a pair of L-shaped spring members which are integrally molded on each side of a plastic housing providing a cavity for receiving the cartridges, with one end of each of the L-shaped spring members being formed with and attached to the housing. The other ends of the integral spring members extend into the cavity and into the path of a cartridge which is inserted therein. The spring members are cammed out of engagement with the front surface of the cartridge when a cartridge is inserted into the cavity and are shaped to fit into and engage a slot on each side of the cartridge when it is fully inserted into the cavity into a tape-playing position. In this position, the spring members hold the cartridge locked into position until it is manually removed from the cavity.

PATENTED OCT 12 1971 3,612,541

INVENTOR
WILLIAM B. HUBER

BY Mueller, Aichele & Rauner
ATTORNEYS

CARTRIDGE LOCKING MECHANISM

BACKGROUND OF THE INVENTION

In cartridge-type tape players currently being used extensively in automobiles and in other reproducing systems, it is necessary to provide some means for firmly positioning or locking the cartridge against the tape driving capstan and playback head when the cartridge is inserted into the player. Most mechanisms for accomplishing such locking of the cartridge into place involve the use of separately formed spring structure, which must be attached to the housing as a separate step in the manufacture of the tape player in which the structure is used. This results in additional manufacturing costs, and it is desirable tò provide a simple and inexpensive cartridge locking mechanism which operates automatically upon insertion of the cartridge and which is relatively simple to manufacture.

SUMMARY OF THE INVENTION

It is an object of this invention to provide an improved tape cartridge locking mechanism.

It is another object of this invention to reduce the number of manufacturing steps in providing a cartridge locking mechanism for a cartridge tape player.

It is a further object of this invention to form a cartridge locking mechanism integrally with the cartridge receiving housing of a tape player.

In a preferred embodiment of this invention a locking mechanism, for retaining an exchangeable cartridge within a housing, includes at least one notch or slot engaging member integrally formed with the housing and extending into the cavity into which the cartridge is to be inserted in an amount sufficient to engage a notch on the cartridge, with the portion of the notch-engaging member which engages the notch being shaped to fit into the notch on the cartridge.

DETAILED DESCRIPTION

Figure 1:
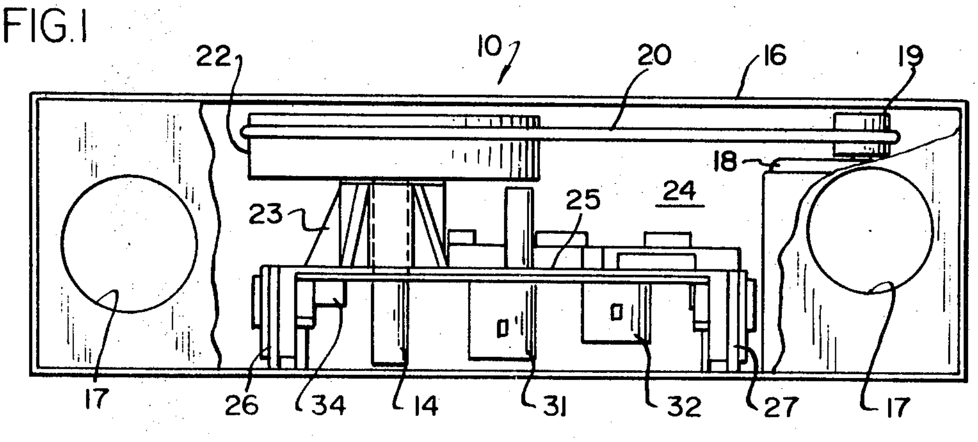
FIG. 1 is a front elevation view showing a tape player apparatus in accordance with a preferred embodiment of this invention.

Referring now to the drawing, in which like reference numerals are used throughout the several views to identify the same parts, FIG. 1 shows a tape player apparatus 10 which is adapted to receive and play standard tape cartridges or cassettes, such as the cartridge 11 (FIGS. 2 and 3), having a multitrack tape therein. The cartridges are positioned within a cartridge receiving cavity in the tape player apparatus to cause a cartridge pressure roller 12 to be engaged by a capstan shaft 14 to drive the tape through the cartridge 11. In the type of cartridges 11 being illustrated for use in conjunction with the apparatus shown in FIG. 1, the pressure roller is spring-biased toward the front of the cartridge; and when it engages the capstan 14, it is pushed to a position located relatively deeper within the cartridge as may best be seen in FIG. 3. In such cartridges, movement of the pressure roller into the cartridge also releases the storage reel holding the tape within the cartridge for rotation.

The tape playing apparatus includes an outer casing 16 (FIG. 1) which extends substantially around and encloses the parts of the apparatus. This housing 16 then may be mounted behind the dashboard of an automobile, for example, and has a pair of openings 17 located in the front surface which cooperate with openings in the dashboard for receiving control knobs for operating the tape player. An electric motor 18 drives a pulley 19 which is connected through a belt 20 to a capstan flywheel 22, which in turn causes rotation of a capstan 14 extending into the cartridge receiving cavity of the tape player. The capstan 14 and capstan flywheel 22 are mounted on and carried by a molded mounting platform 23 which is formed as an integral part of an inner molded plastic housing member 24, which preferably is formed from a substantially rigid plastic material. The inner molded housing member 24 has an upper surface 25 and a pair of side members 26 and 27 extending downwardly from the upper surface 25 (as viewed in FIG. 1). Each of these side members 26 and 27 carries reinforced portions having holes 29 therethrough for permitting the passage of a suitable fastening device, such as a screw or bolt, through the side members and into the bottom surface of the outer housing 16; so that the inner housing 24 may be firmly attached to and mounted within the housing 16. The bottom surface of the outer housing 16 then completes the enclosure of the cartridge receiving cavity, the other sides of which are defined by the sides 26 and 27 and top 25 of the inner housing 24.

Provision also is made on the upper surface 25 of the housing 24 for integrally molded mounting surfaces and mounting holes so that a pair of magnetic pickup or playback heads 31 and 32 may be mounted within the housing 24 in a position to engage the tape of a cartridge inserted into the above-defined cartridge receiving cavity. To prevent insertion of a cartridge too deeply into the cavity, an abutment or stop 34 is integrally molded into the inner housing 24 and is attached to the sidewall 26 and the upper surface 25. This abutment 34 extends into the cavity into a position to be engaged by the end 40 of a cartridge 11 inserted into the cavity formed within the housing.

An opening 35, 36 is formed in each of the sides 27 and 26, respectively, of the inner housing 24 at a point opposite the position of a pair of corresponding slots or notches 44, 45 formed in the side of a standard cartridge 11 when the cartridge is fully inserted into playing apparatus shown in the drawings. Extending into each of the openings 35 and 36 is one end of a corresponding, resilient, L-shaped spring member 37, 38. The spring members 37 and 38 are attached to and integrally molded and formed with the sidewalls 27 and 26, respectively.

Figures 2, 3:
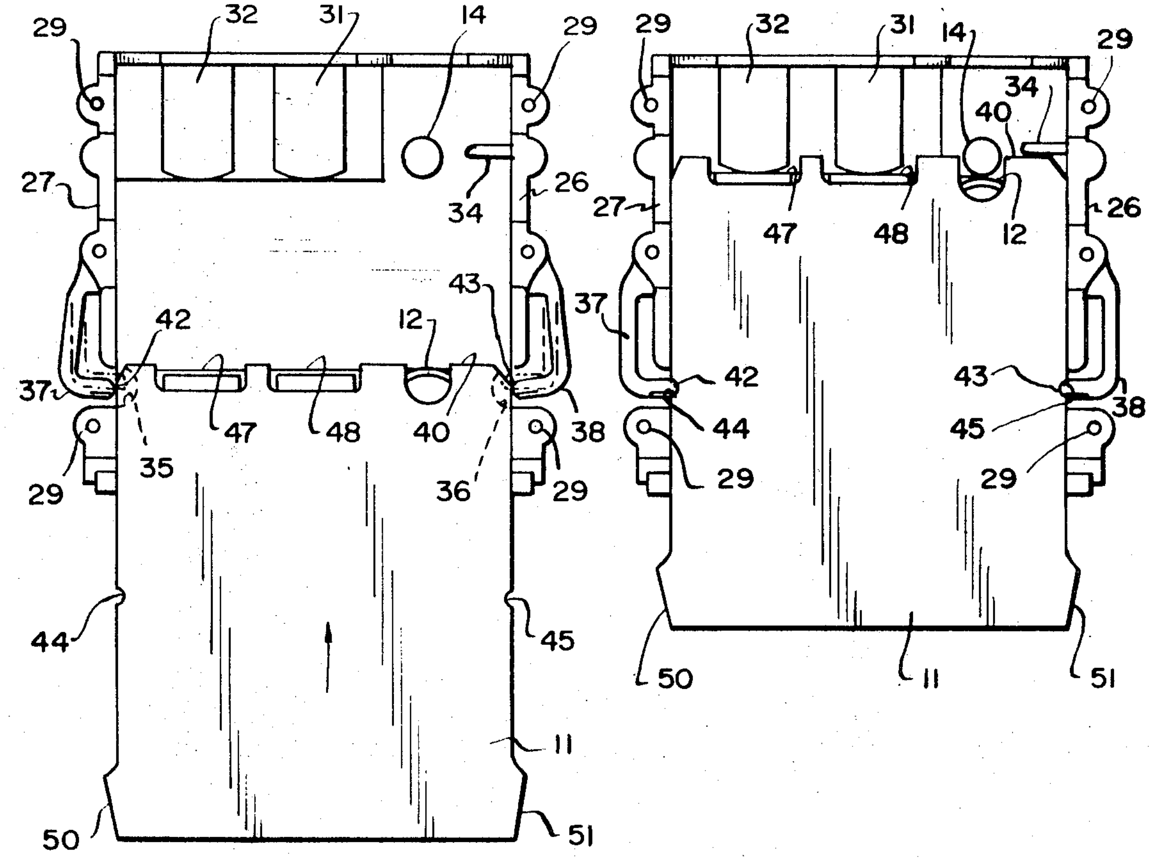
FIG. 2 is a bottom view of a portion of the apparatus shown in FIG. 1 with a tape cartridge being indicated as just being inserted into the apparatus.
FIG. 3 is a bottom view of a portion of the apparatus shown in FIG. 1 with a tape cartridge shown in its fully inserted position.

In their relaxed position, the long dimensions of the spring members 37 and 38 are substantially parallel to the sides 27 and 26 of the inner housing member 24 (as shown in dotted lines in FIG. 2). In this relaxed position, the notch engaging ends 42 and 43 of the spring members extend into the cavity formed between the sidewalls 26 and 27 and into the path of a tape cartridge 11 which may be inserted into this cavity. It should be noted that these sidewalls 26 and 27 are spaced apart at a distance which is slightly greater than the width of the cartridges 11 which are to be inserted into the cavity, and that the distance between the notch or slot engaging end portions 42 and 43 of the resilient spring members 37 and 38 is less than the width of a cartridge 11.

The front surface 40 of the cartridge 11, at each of its outer edges, has a camming surface for engaging the ends 42 and 43 of the spring members 37 and 38 to cam them out of the path of the cartridge when it is inserted into the cavity. On each side of the cartridge 11 is a slot 44 and 45 extending perpendicularly to the longitudinal dimension of the cartridge 11. The slots 44 and 45 are located such that when the end 40 of the cartridge 11 is almost in engagement with the abutment 34, the slots 44 and 45 are aligned with the slot engaging end portions 42 and 43 of the resilient spring members 37 and 38. As a consequence, when the cartridge is fully inserted into the cavity, as shown in FIG. 3, the resilient spring members 37 and 38 force the slot engaging end portions 42 and 43 into the slots 44 and 45 to firmly hold the cartridge 11 in a playing position. In this position the pressure roller 12 in the cartridge is firmly spring-biased against the capstan 14, as stated previously; and the reproducing heads 31 and 32 engage a pair of pressure pads 47 and 48, with the tape passing between the heads 31 and 32 and the pressure pads causing the tape to be in good reproducing contact with the reproducing heads 31 and 32.

When it is desired to remove the cartridge 11 from the tape player, a pair of projections 50 and 51 on the rear of the cartridge may be grasped manually; and the cartridge may be withdrawn in a direction opposite the arrow shown in FIG. 2. The rounded configuration of the notches 44 and 45 and the corresponding configuration of the notch engaging end portions 42 and 43 of the spring members 37 and 38 permits the spring members to be cammed out of engagement with the notches 44 and 45 upon withdrawal of the cartridge 11; and upon complete removal of the cartridge from the cavity, the resilient spring members 37 and 38 resume the dotted line position shown in FIG. 2 to extend to a position within the cavity formed within the inner housing member 24.

The mounting surfaces for the capstan flywheel 22 and capstan 14, the reproducing heads 31 and 32, the reinforced portions for receiving the mounting screws, and the resilient spring members 37 and 38 all are formed in a single operation by molding them out of plastic material as part of the inner housing 24. No additional manufacturing steps are required in order to form or mount the spring members 37 and 38. As a consequence, an extremely simple and easy to manufacture cartridge holding mechanism is effected, merely by utilizing the inherent resiliency of the plastic used to form the housing to provide the required resiliency needed for the retaining springs 37 and 38.

I claim:

1. Apparatus using an exchangeable cartridge having a predetermined width and having a holding slot formed on at least one side thereof, said apparatus including in combination:

a cartridge receiving housing formed out of one piece of molded plastic material and having at least a pair of sidewalls at least one of which has an opening therein, and means interconnecting the sidewalls to form a cartridge receiving cavity, the distance between the sidewalls being slightly greater than the predetermined width of the cartridge;

at least one integrally formed resilient spring member attached to and integrally molded as part of the housing and of the same material as the housing, a portion of the resilient spring member extending into the opening in one of the sidewalls so that the distance between said portion of the resilient member and the opposite sidewall is less than the predetermined width of the cartridge, the portion of the resilient member extending into the cavity being shaped to engage and fit into the holding slot on one side of a cartridge thereby engaging and holding said cartridge within the cavity; and an abutment on said housing extending into the cavity into the path of a cartridge inserted therein an located to be engaged by the cartridge to cause the cartridge to be positioned with the holding slot thereof substantially aligned with the portion of the resilient member extending into the opening in said one of the sidewalls when the cartridge engages the abutment.

2. The combination according to claim 1 wherein the abutment is integrally molded as part of the housing.

3. The combination according to claim 1 wherein the housing includes a pair of integrally formed resilient spring members attached to and integrally molded with corresponding ones of the pair of sidewalls of the housing, a portion of each of the resilient spring members extending into openings in each of the corresponding sidewalls for engaging slots on each side of a cartridge placed within the cartridge receiving cavity, the portion of each spring member extending into the cavity being shaped to engage and fit into a corresponding slot in the cartridge.

4. Apparatus using an exchangeable cartridge having a predetermined width and having at least one holding slot located on one side thereof, the apparatus including in combination:

a housing molded as one piece of plastic material and having at least three sides defining a cartridge receiving cavity, with two of the sides extending substantially 90° from the third of the sides and being spaced apart at a distance which is slightly greater than the width of the cartridge;

at least one L-shaped spring member having one long arm and one relatively short arm integrally molded as part of the housing and located on one side thereof, the long arm of the spring member being attached to the housing and the short arm of the spring member extending through an opening in said one side of the housing into the cavity, with the end of the short arm of the spring member being shaped to engage a slot on the corresponding side of a cartridge being inserted into the cavity, and with the distance between the slot engaging end of the spring member in its relaxed position and the opposite side of the housing being less than the width of the cartridge; and an abutment integrally molded with the housing and extending into the cavity in the path of the cartridge to prevent insertion of the cartridge past the abutment, the abutment being located so that movement of the cartridge into engagement therewith causes the slot in the side of the cartridge to be engaged by the slot engaging end of the short arm of the spring member.

5. Apparatus using an exchangeable cartridge having a predetermined width and having holding slots located on opposite sides thereof, the apparatus including in combination:

a molded housing having at least three sides defining a cartridge receiving cavity with two of the sides extending substantially 90° from the third of the sides and being spaced apart at a distance which is slightly greater than the width of the cartridge;

a pair of L-shaped spring members integrally molded with the housing and located on opposite sides thereof, each spring member having one long arm and one relatively short arm, the long arm of each spring member being integrally formed with and attached to the housing and the short arms of the spring members each extending through an opening in a different side of the housing into the cavity, with the ends of the short arms of the spring members being shaped to engage slots on corresponding sides of a cartridge inserted into the cavity, the distance between the slot engaging ends of the short arms of the spring members in their relaxed position being less than the width of the cartridge; and an abutment integrally molded with the housing and extending into the cavity in the path of the cartridge to prevent insertion of the cartridge past the abutment, the abutment being located so that movement of the cartridge into engagement therewith causes the slots in the sides of the cartridge to be engaged by the slot engaging ends of the short arms of the spring members; the housing, spring members, and abutment being formed out of one piece of molded plastic material.

6. The combination according to claim 5 wherein the ends of the spring members extending into the cavity have camming surfaces thereon for being cammed out of the path of a cartridge when the cartridge first engages the spring members upon being inserted into the cavity, with said ends being shaped to fit into and engage the notches on the sides of the cartridge when the cartridge is fully inserted into the cavity.